United States Patent

Johnson et al.

[11] Patent Number: 5,949,636
[45] Date of Patent: *Sep. 7, 1999

[54] PORTABLE PEST ELECTROCUTION DEVICE WITH RESISTIVE SWITCH TRIGGER

[75] Inventors: William L. Johnson, Somis; Robert Noe, Ojai; William R. Luther, Santa Paula, all of Calif.

[73] Assignee: Agrizap, Inc., Ventura, Calif.

[*] Notice: This patent is subject to a terminal disclaimer.

[21] Appl. No.: 08/810,030

[22] Filed: Mar. 4, 1997

Related U.S. Application Data

[63] Continuation of application No. 08/255,328, Jun. 7, 1994, abandoned.

[51] Int. Cl.[6] ........................... A01M 23/02; A01M 19/00
[52] U.S. Cl. ................................... 361/232; 43/98
[58] Field of Search .................. 34/573; 43/98, 43/112; 256/10; 361/232

[56] References Cited

U.S. PATENT DOCUMENTS

| | | |
|---|---|---|
| 909,814 | 1/1909 | Norris . |
| 1,031,442 | 7/1912 | Haxton . |
| 1,541,985 | 6/1925 | Marquis . |
| 1,680,594 | 8/1928 | Connolly et al. . |
| 2,003,513 | 6/1935 | Myers . |
| 2,098,884 | 11/1937 | Rousseau . |
| 2,161,789 | 6/1939 | Wingfield . |
| 2,191,127 | 2/1940 | Hazel . |
| 2,420,723 | 5/1947 | Ratchford . |
| 2,595,130 | 4/1952 | Edwards . |
| 3,197,916 | 8/1965 | Cole et al. . |
| 3,388,497 | 6/1968 | Levine . |
| 3,468,054 | 9/1969 | Levine . |
| 3,792,547 | 2/1974 | Day . |
| 3,827,176 | 8/1974 | Stirewalt . |
| 4,048,746 | 9/1977 | Dye ............................. 43/98 |
| 4,074,456 | 2/1978 | Tidwell . |
| 4,200,809 | 4/1980 | Madsen ..................... 256/10 |
| 4,205,480 | 6/1980 | Gartner . |
| 4,497,130 | 2/1985 | Fitzgerald . |
| 4,780,985 | 11/1988 | Coots . |
| 5,269,091 | 12/1993 | Johnson et al. ............. 43/98 |

FOREIGN PATENT DOCUMENTS

| | | |
|---|---|---|
| 2650385 | 11/1976 | Germany . |
| 443772 | 2/1968 | Switzerland . |
| 8700727 | 2/1987 | WIPO . |

*Primary Examiner*—Fritz Fleming
*Attorney, Agent, or Firm*—Koppel & Jacobs

[57] ABSTRACT

The present invention is a method and apparatus for electrocuting pests such as gophers, rats and the like. The present invention employs a resistive switch that uses the same electrodes to sense the presence of a pest therebetween as are used to electrocute the pest. The resistive switch senses a leakage current flowing through the pest and into the reference electrode of its electronic circuit and uses the presence of this current to trigger the generation of a high voltage and current that is of sufficient magnitude to dispatch the pest. A timer deactivates the generator after a predetermined time has elapsed to save battery power. A status indicator is provided that does not consume power unless activated by a user. The invention will not retrigger until reset by turning it off and then on again, thereby activating the power on reset circuit. The generator is battery powered and has been designed to collapse the output voltage if more current than is necessary to electrocute a rodent is attempted to be drawn from it.

24 Claims, 6 Drawing Sheets

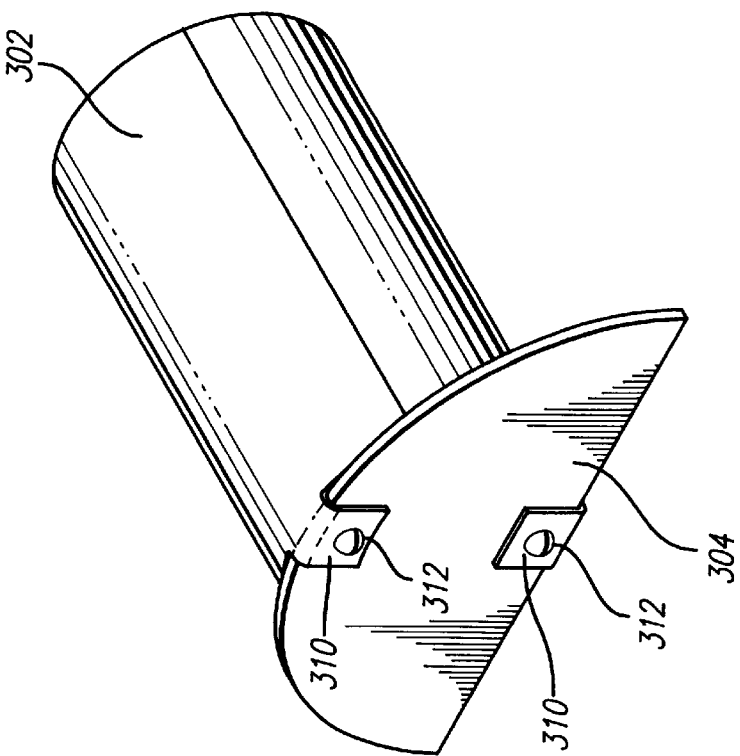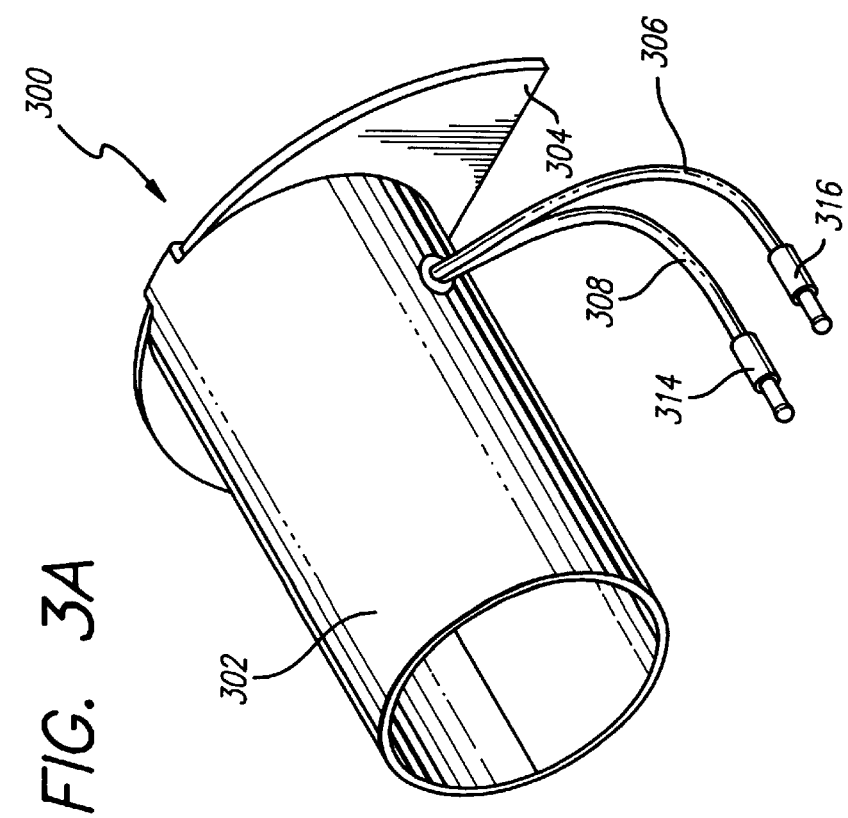

PORTABLE PEST ELECTROCUTION DEVICE WITH RESISTIVE SWITCH TRIGGER

RELATED APPLICATIONS

This application is a continuation of U.S. Ser. No. 08/255,328 filed Jun. 7, 1994, now abandoned, and to which the priority thereof is hereby claimed under 35 U.S.C. § 120.

BACKGROUND OF THE INVENTION

1. Field of the Invention

The present invention relates to a device for dispatching pests through electrocution; more particularly the present invention uses a resistive switch, coupled to a conductive plate, to detect the presence of a pest between the plate and ground, and to trigger a high voltage and current which is supplied through the same electrodes used to sense the pest of sufficient amplitude to electrocute the pest.

2. Description of the Related Art

Residential areas, farms and ranches are often disrupted by burrowing pests such as gophers and the like, which can cause large amounts of physical and economic damage to such grounds. Urban areas, industrial plants and large food manufacturing and preparation facilities are often plagued by the presence of rats and mice. Numerous traps have been designed in the past for eliminating such pests by various means including electrocution. Prior art traps, however, suffer from various deficiencies.

Existing devices typically have very complicated structures that are costly to manufacture. Further, these designs are not conveniently employed without disruption of the rodent's natural environment, making it more likely that rodents will seek to avoid them as foreign because of their disruptive nature.

Finally, these prior art traps do not always reliably sense the presence of a rodent or reliably dispatch the rodent which has been sensed. For example, some prior art traps supply a continuous high voltage which not only requires a considerable supply of power, but may not completely dispatch the rodent if good contact is not made between the rodent and the high voltage terminals. In addition, some pests may be able to sense the presence of the high voltage without making sufficient contact for electrocution.

Most prior art designs that employ triggers are mechanically actuated, requiring the pest to exert the force necessary to close contacts; such mechanical switches can be very unreliable. Some prior art designs attempt to trigger the device through a separate sense contact, which permits triggering of the high voltage output without need for some force to be exerted by the pest.

While this design eliminates the unreliability associated with mechanical actuation, it only assures good contact between the rodent and the sense contact, not between the pest and the high voltage electrodes. A pest may be in physical contact only with the sense electrodes. Environmental conditions such as temperature and humidity may not sufficiently decrease conductivity between the pest and the sense contact to impede the sense function, while conductivity between the pest and the high voltage contacts may be sufficiently reduced to prevent the level of current flow from reaching a lethal level. Rodents that encounter such traps without lethal results can learn to avoid them in the future. U.S. Pat. No. 4,048,746 issued on Sep. 20, 1977 to Joseph R. Dye illustrates many of the difficulties of such a prior art trap. The patent shows an electronic device used to exterminate rodents in their burrows without the removal of soil; the design attempts to minimize its impact on the rodent's natural environment. The device includes a stick-type carrier for insertion into the soil, a metal sleeve which is installed on the tip of the carrier constituting an electric ground, and two brass rings which are secured on the stick-type carrier serving as sense control and high voltage electrodes. The device further includes a circuit which is connected to the metal sleeve and the two brass rings to test the location of a burrow and provide high voltage and current. The circuit includes two control transistors, a relay and a high voltage transformer. The circuit is also provided with a light which gives a continuously visual alarm indicating that a rodent has been electrocuted.

This device has many shortcomings for which the present invention provides solutions. First, this device employs two sets of contacts, one to sense the rodent's presence, and a second to provide the lethal dose of high voltage and current. As previously discussed, the fact that sufficient contact has been made between the rodent and the sense contacts does not guarantee that good contact has been made between the rodent and the high voltage contacts. Thus, the design permits the rodent to avoid good contact with the high voltage electrodes, and even to avoid contact with the carrier altogether.

Further, the conductivity of the sense contact will not necessarily be affected by environmental conditions in the same way that the high voltage contacts are. Thus, the sense contacts may be sensitive enough to indicate the presence of the rodent even though the conductivity of the high voltage contacts have been affected to such an extent that they cannot provide a lethal current. The rodent must make good contact between the two contacts on the apparatus for the lethal current to flow.

This device also consumes a good deal of power unnecessarily because the alarm light is illuminated continuously until the user removes the carrier. Finally, even if the rodent makes optimal contact with the carrier, the design permits the shock itself to easily disengage the rodent from the carrier, thus making it imperative that the rodent be electrocuted within a very short period of time subsequent to the onset of the high voltage and current.

U.S. Pat. No. 3,468,054 issued on Aug. 15, 1967 to Irving Levine discloses an electrical rodent exterminator. The exterminator includes a casing which has a rodent entrance chamber and metal grids therein. A bait is disposed on the rear wall in the casing. The front of the rodent entrance chamber is open for rodents. There is a swinging baffle hanging vertically in the chamber. If a rodent which comes into the chamber for the bait stands on the grids and pushes the swinging baffle, the swinging baffle will rotate a rod which, in turn, closes the switch in a circuit for electrocuting the rodent. The circuit includes a transformer and a clock timer for providing a timed cycle of high voltage current to the grids. The circuit also has a signal lamp which is turned on after electrocution. Obviously, this type of exterminator has a complicated structure and is not suitable for use in a burrow or other restricted area due to its large size. The exterminator is also power inefficient due to the continual illumination of the signal lamp. In addition, this device is not efficient because electrocution of the rodent requires that the rodent first find the entrance, then move into the chamber, and finally push the swinging baffle in order to trigger the circuit.

Other conventional rodent traps are disclosed in a number of patents including U.S. Pat. No. 4,780,985 issued on Nov.

1, 1988 to Clande G. Coots; U.S. Pat. No. 4,497,130 issued on Feb. 5, 1985 to John P. Fitzgerald; U.S. Pat. No. 4,205, 480 issued on June 3, 1980 to William J. Gartner; U.S. Pat. No. 3,827,176 issued on Aug. 6, 1974 to Homer A. Stirewalt; U.S. Pat. No. 4,074,456 issued on Feb. 21, 1978 to Robert Wayne Tedwell; U.S. Pat. No. 3,792,547 issued on Feb. 19, 1974 to Leon E. Day; U.S. Pat. No. 3,197,916 issued on Aug. 3, 1965 to S. L. Cole, Jr., et al; U.S. Pat. No. 3,388,497 issued on Jun. 18, 1968 to I. Levine; U.S. Pat. No. 909,814 issued on Jan. 12, 1909 to Hosea Haxton; U.S. Pat. No. 1,680,594 issued on Aug. 14, 1928 to T. F. Connolly et al; U.S. Pat. No. 2,003,513 issued on Jun. 4, 1935 to L. D. Myers; U.S. Pat. No. 2,098,884 issued on Nov. 9, 1937 to E. B. Rousseau; U.S. Pat. No. 2,161,789 issued on Jun. 13, 1939 to G. L. Wingfield; U.S. Pat. No. 2,191,127 issued on Feb. 20, 1940 to C. T. Hazel; U.S. Pat. No. 2,420,723 issued on May 20, 1947 to H. L. Ratchford; and U.S. Pat. No. 2,595,130 issued on Apr. 29, 1952 to L. R. Edwards. These conventional rodent traps normally include a chamber or channel in which a bait is used to attract the rodent. The rodent has to find the entrance of the chamber before taking the bait. When a mechanical switch in the chamber is touched or moved by the rodent, a circuit is completed to electrocute the rodent. In some of the conventional rodent traps, two elements have to be contacted or pushed at the same time by the rodent in order to trigger the circuit. In addition, these traps are either complicated to manufacture or are inconvenient to use.]

U.S. Pat. No. 5,269,091, issued on Dec. 14, 1993 to William Johnson, et al., discloses a rodent electrocution device with a design which solves some of the shortcomings of the prior art previously discussed. The disclosed trap has a specially designed mechanical structure the purpose of which is to employ the weight of the pest to trigger the high voltage circuit and to ensure a good contact between the rodent and the high voltage contacts.

While this design provides improved performance over the prior art previously discussed, its enhanced performance is primarily due to innovations that are concentrated in the mechanical portion of the circuit. As a result, this design still presents some problems with respect to cost of manufacture, ease of implementation and reliability. Therefore, there is still room for further advancement in the art of pest elimination through electrocution.

BRIEF SUMMARY OF THE INVENTION

The present invention provides a method and portable apparatus for sensing the presence of a rodent or other pest and then dispatching the rodent by applying a high voltage and current to the pest. The apparatus of the invention has an electronic portion which is conductively coupled to a relatively compact, unobtrusive and lightweight mechanical portion with virtually no moving parts.

The mechanical portion can be adapted to the type of pest to be eliminated. In general, the mechanical portion has a conducting plate attached to the top of a nonconductive surface. The nonconductive surface electrically isolates the conductive plate from the ground electrode. In the preferred embodiment for eliminating burrowing pests, the nonconductive surface is stretched across the top of a hollow base structure which is also nonconductive so as to isolate the conductive plate from ground. The plate is conductively coupled to the high voltage output of the electronic portion to form a high voltage electrode, while the ground of the electronic portion is coupled to the earth using a ground stake or some other similar means to form a ground electrode. This embodiment of the mechanical portion is preferably made with low profile dimensions so that it is easily disposed in the small burrows and tunnels of a burrowing pest's environment with minimal impact.

A second preferred embodiment of the mechanical portion, suited to the elimination of nonburrowing rodents such as rats and mice, also has a conductive plate that is disposed within a cylindrical metal structure. A nonconductive layer isolates the conductive plate from the surrounding cylindrical structure. The conductive plate is coupled to the high-voltage output of the electronic portion to form a high voltage electrode, while the cylindrical structure is coupled to circuit ground to form a ground electrode. Bait may be disposed within the cylinder to entice pests to enter the cylinder and to make contact with the two electrodes. This embodiment of the mechanical portion is designed to resemble a discarded can.

The apparatus of the present invention has all of its sensing, triggering, timing and high voltage and current generating circuitry contained within the electronic portion, which is disposed above ground or away from the mechanical portion. The sensing circuitry, which includes a resistive switch, and the high voltage output share the same electrodes, i.e. the single conducting plate and either earth or circuit ground. Thus, if a rodent is making sufficient contact with the high voltage electrode and the ground electrode such that its presence can be sensed by the resistive switch, it is most likely making sufficient contact for purposes of electrocution.

The resistive switch sensing circuit is designed to detect a small leakage current created by the resistance of the animal between the two electrodes. Good contact must be established before this current will be large enough to trigger a timing circuit. Triggering the timing circuit activates a high voltage pulse train generator circuit for some predetermined time. The pulse train generator circuit is designed to provide levels of voltage and current lethal to the type of pests to be eliminated. The circuit is designed not to provide voltage and current sufficient to injure humans.

The timer circuit times out and shuts off the high voltage output after the predetermined time has elapsed subsequent to the circuit being triggered. The predetermined time can be easily adjusted to suit the application and the available power. The timer conserves battery power even if a rodent (or any resistive body) continues to make contact between the electrodes. A status indicator will illuminate to indicate that the circuit has been triggered and requires resetting, but only upon activation by the user. Thus, no power will be consumed from the battery by the status indicator except while activated by a user. The apparatus can be reset by cycling power to the circuit portion.

It is therefore an objective of the present invention to provide a portable pest electrocution device that is capable of operating in remote locations on battery power.

It is also an objective of the present invention to provide a device that can be easily adapted for use in different environments through separate mechanical and electronic portions; only the mechanical portion need be disposed inside the pest's natural environment while the electronic portion remains accessible to the user.

It is a further objective of the present invention to minimize the complexity of its mechanical portion so that the mechanical portion is inexpensive to manufacture, is easily introduced into and makes minimal impact on the pest's natural environment, and has increased reliability through elimination of virtually all moving parts.

It is a further objective of the present invention to minimize power consumption by triggering a high voltage pulse train output only when a pest to be electrocuted is present and in good contact with the high voltage electrodes.

It is still further an objective of the present invention to improve reliability by employing a resistive switch to sense the presence of a pest, thereby eliminating moving mechanical parts to trigger the high voltage output.

It is still further an objective of the present invention to improve reliability by ensuring good contact between the pest to be electrocuted and the high voltage electrodes of the apparatus, by using the same electrodes to sense the presence of the pest and to provide the high voltage and current necessary to electrocute the pest.

A still further objective of the present invention is to employ a ground electrode that surrounds the conductive plate to increase the chances that a pest will bridge the two contacts.

It is still further an objective of the present invention to make remote battery operation feasible by limiting the power consumption from the batteries by timing the high voltage output to last just long enough to dispatch a particular type of pest, even if the presence of the body which triggered the circuit initially remains in contact with the device.

It is still further an objective of the present invention to provide a status indicator to inform a user that the circuit has been triggered, but only when activated by a user to further limit power consumption.

It is even further an objective of the present invention to limit the voltage and current generating capabilities of the electronic portion only to those levels sufficient to dispatch a pest, thus minimizing the danger of injury to humans.

BRIEF DESCRIPTION OF THE DRAWINGS

FIG. 3a illustrates a front view of a preferred embodiment of the mechanical portion for eliminating nonburrowing rodents such as rats and mice.

FIG. 3b illustrates a rear view of a preferred embodiment of the mechanical portion for eliminating nonburrowing rodents such as rats and mice.

DETAILED DESCRIPTION OF THE INVENTION

In the following description, specific electronic devices, component values and materials are set forth in order to provide a thorough understanding of the preferred embodiment of the present invention. It will be apparent to one skilled in the art, however, that functionally equivalent electronic components, or components having different values or made of equivalent materials may be substituted for those disclosed without departing from the intended scope of the present invention. In other instances, well-known circuits and structures are not described in detail to avoid obscuring the present invention unnecessarily.

Figure 1:
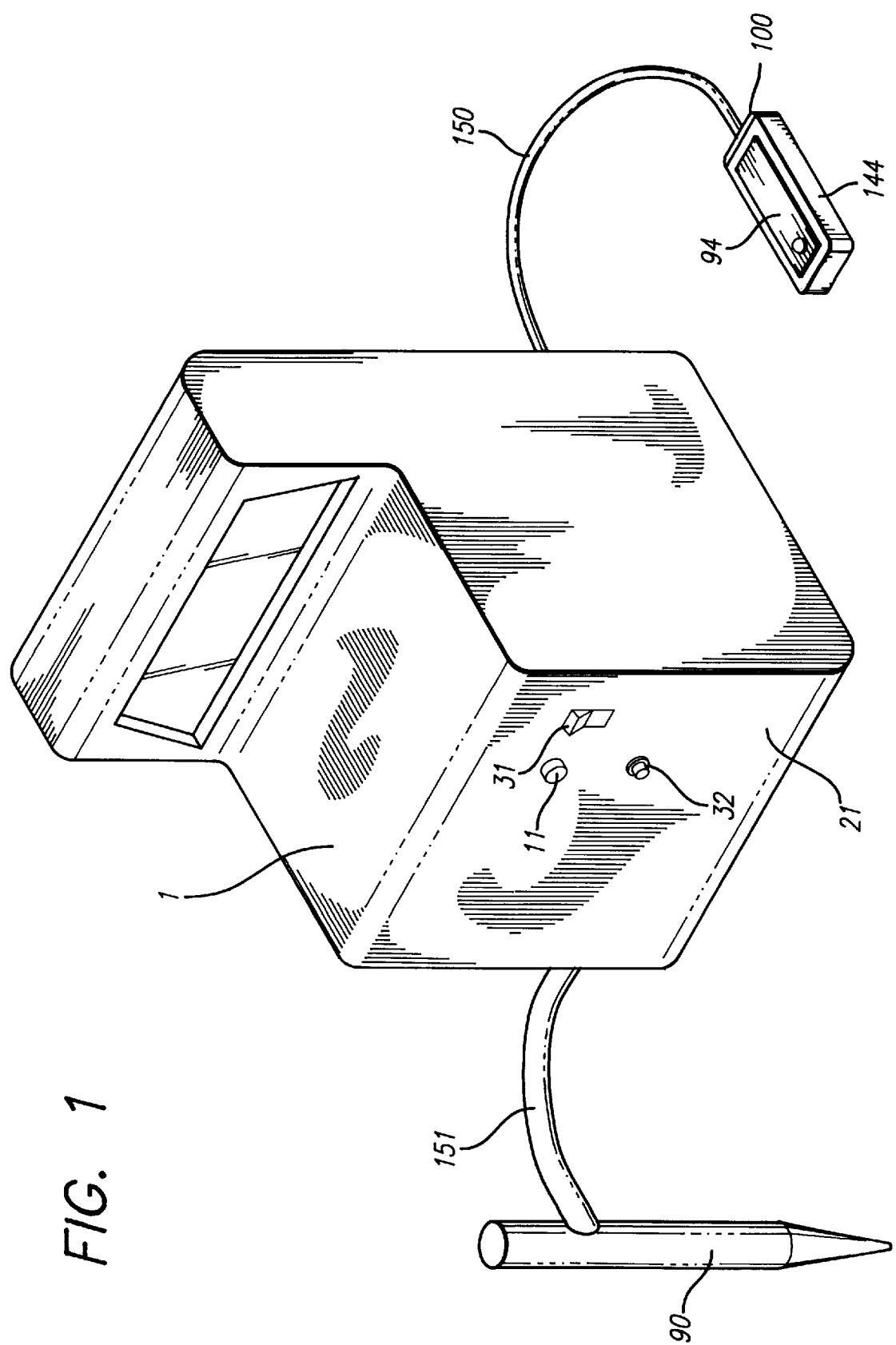
FIG. 1 illustrates a preferred embodiment of the present invention with a mechanical portion suitable to eliminate burrowing pests in their environment.

With reference to FIG. 1, an overview of the operation of the present invention is presented. The present invention employs an electronic portion 1 and a mechanical portion 100 which are connected conductively by conducting cable 150. Mechanical portion 100 as depicted is particularly suited to eliminating burrowing pests as it has a low profile and is small enough in surface area to be inserted into the environment with minimal impact. Mechanical portion 100 has a conducting plate 94 that forms its top surface and which is isolated from ground. It is attached to a nonconductive base 144 which isolates the conducting plate 94 from the ground. Of course, the mechanical portion 100 may take on any number of shapes and/or dimensions suited to the environment in which it is to be disposed. A second embodiment of a mechanical portion more suitable to eliminating above ground pests such as rats will be described below.

Electronic portion 1 is positioned above ground or otherwise outside of the pest's environment to remain accessible to the user and to minimally impact the pest's environment. Electronic portion 1 is made portable and is battery operated for use in areas too remote to have easy access to a fixed power source. A conductive ground stake 90 is inserted into the ground in close proximity to the mechanical portion 100, and is conductively coupled to the circuit ground output of circuit portion 1 through insulating cable 151 to form a ground electrode. A high voltage and current output of electronic portion 1 is coupled to conductive plate 94 through insulating cable 150 to form a high voltage electrode.

When a pest makes contact with the high voltage and current electrode through plate 94, a small leakage current flows from the battery supply through the pest and into the reference electrode via the ground stake 90. This current is used to trigger the output of a high voltage and current between the two electrodes which dispatches the pest. The high voltage and current output is maintained until a predetermined time has elapsed and is deactivated. Once triggered, the electronic portion 1 cannot be retriggered until power is turned off and then on again via switch 2 (See also FIG. 5). A user can check to see if the electronic portion has been triggered by depressing button 21; if light 11 illuminates, the electronic portion has been triggered.

Figure 2:
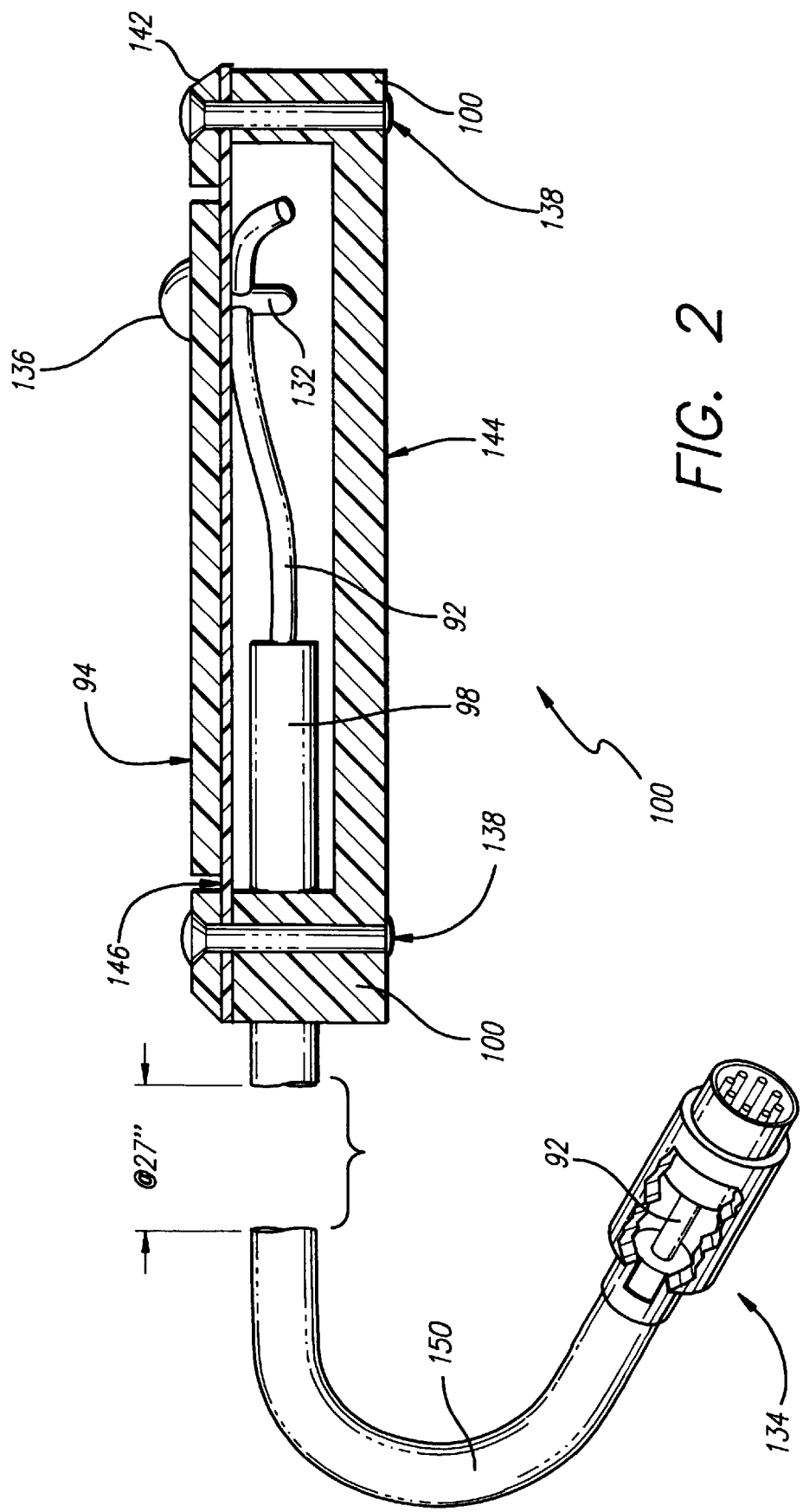
FIG. 2 illustrates a preferred embodiment of the mechanical portion of the present invention for eliminating burrowing pests.

FIG. 2 shows a preferred embodiment of mechanical portion 100, suited for employment in a gopher burrow or similar pest living environments. Conducting plate 94 is preferably comprised of aluminum, but other conductive materials may be equally or better suited to a given environment. Conducting plate 94 is rectangular in shape and is secured to the top surface of a nonconductive layer 146 that is preferably made of vinyl or other suitable insulating materials. Layer 146 is then secured to the top edges of sidewalls 100 of a rectangular nonconductive base 144 by fasteners 138 through a nonconductive rim 142. The rim 142 and base 144 can be made of ABS plastic or other suitable nonconductive materials. Fasteners 138 can be aluminum squeeze rivets or other suitable devices for fastening. The resulting structure is thus preferably formed with a hollow interior as shown in FIG. 2.

Conducting cable 150 has an insulated jacket 98 that surrounds a single conductive wire 92 of a suitable gauge which is soldered at one end to plug 134. The other end of conducting cable 150 passes through a sidewall 100 of base 144 and its conductive wire 92 is soldered to the lead end 132 of rivet 136. Rivet 136 is made of a conductive material such as aluminum and its lead end 132 is driven through the top of plate 94 and layer 146 so that it maintains conductive contact with plate 94. Those of skill in the art will recognize that there are many suitable ways in which conductive plate 94 can be coupled to conductive wire 92, including soldering.

Figure 3C:
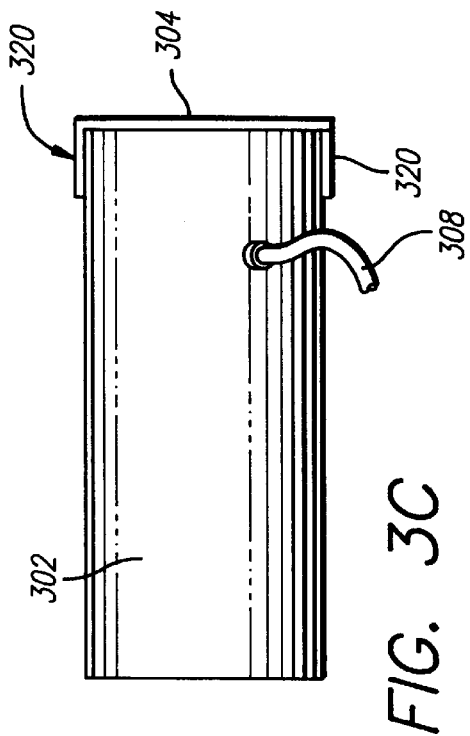
FIG. 3c illustrates a side view of a preferred embodiment of the mechanical portion for eliminating nonburrowing rodents such as rats and mice.

FIGS. 3a–f illustrate a preferred embodiment of a mechanical portion suited for eliminating nonburrowing pests. FIGS. 3a and 3b illustrate front and rear views respectively of the mechanical portion 300, which has a cylindrical portion 302 made of a conducting material such as galvanized steel, and an end portion 304 made of a conductive material such as aluminum. End portion 304 provides stability and a single point of ingress and egress. It also makes disposal of dispatched rodents more convenient. Those of skill in the art will recognize that cylindrical portion 302 could be any shape including rectangular. It could also have a flattened portion where it contacts its resting surface to provide additional stability.

Figure 3E:
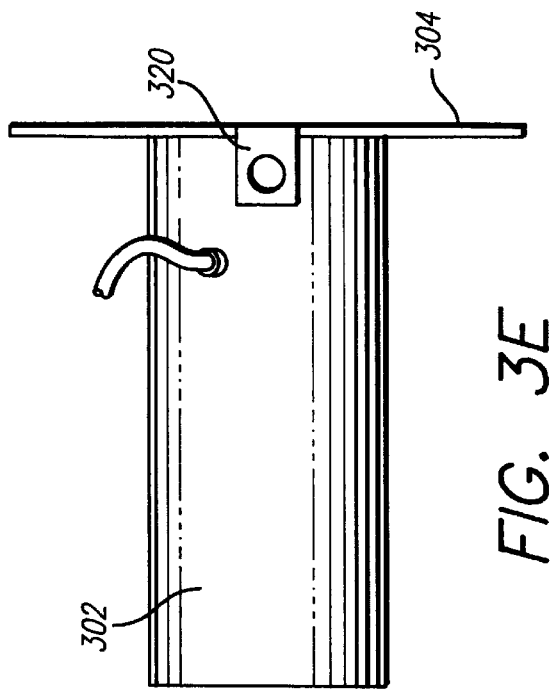
FIG. 3e illustrates a top view of a preferred embodiment of the mechanical portion for eliminating nonburrowing rodents such as rats and mice.

End portion 304 can be attached to cylindrical portion 302 in a number of ways. FIG. 3b shows two tabs 310 which are part of cylindrical portion 302 and which are folded over end portion 304 and secured by pop rivets 312. FIGS. 3c and 3e show tabs 320 which are part of end portion 304 and which attach to the top of cylindrical portion 302.

Figure 3D:
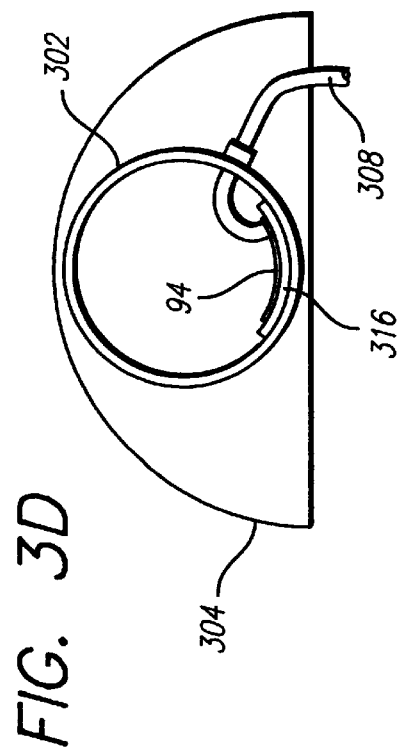
FIG. 3d illustrates an end view of a preferred embodiment of the mechanical portion for eliminating nonburrowing rodents such as rats and mice.
Figure 3F:
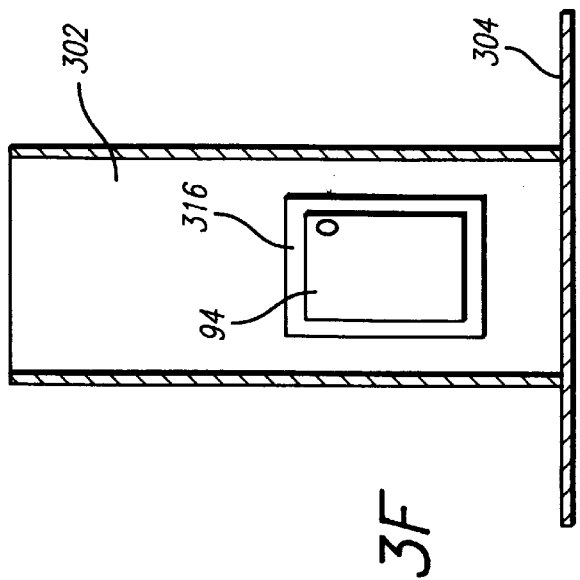
FIG. 3f illustrates an interior top view of a preferred embodiment of the mechanical portion for eliminating nonburrowing rodents such as rats and mice, prior to bending.

The high voltage and high current output of the electronic portion is coupled to the mechanical portion 300 via single conductor cable 308 and connector 314 (FIG. 3a) forming a high voltage electrode, and the circuit ground output of the electronic portion is coupled to mechanical portion 300 via single conductor cable 306 and connector 316 to from a ground electrode. Cable 306 is conductively coupled to the cylindrical portion 302, and cable 308 is conductively attached to conducting plate 94 as shown in FIG. 3d. Conducting plate 94 is electronically isolated from cylindrical portion 302 by a nonconductive layer 316 such as neoprene. The conductive plate 94 and nonconductive layer 316 can be bent to conform to the curve of cylindrical portion 302 as shown.

Figure 4:
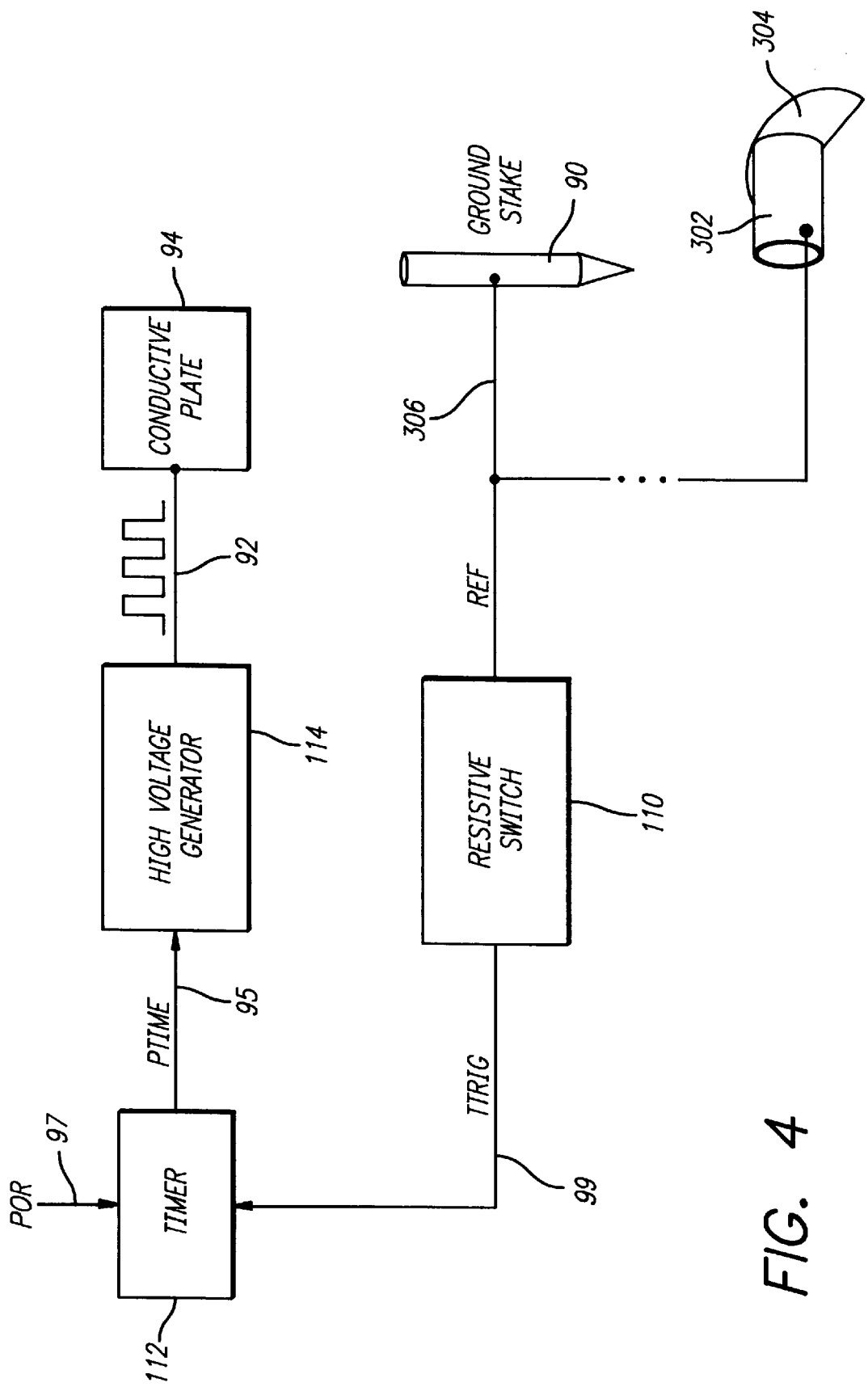
FIG. 4 is a functional block diagram of the electronic portion of the present invention.

FIG. 4 is a block diagram of a preferred embodiment of the electronic portion 1 of the present invention. The electronic portion 1 has three primary modules: Resistive Switch Module 110, Timer Module 112, and High Voltage Generator Module 114. The presence of a pest in contact with high voltage and current electrode 92 (i.e. conductive plate 94) and ground electrode 306 (either through the earth and ground stake 90 or through cylindrical portion 302), is sensed by resistive switch module 110 which outputs an active signal on TTRIG 99. An active TTRIG 99 triggers timer module 112. Timer module 112 immediately outputs an active signal to high voltage generator module 114 on PTIME 95 and maintains this state for a preset time. While the signal on PTIME 95 remains active, High Voltage Generator Module 114 delivers a lethal high voltage, high current pulse train to the pest through output 92 to conductive plate 94. Once the preset time has elapsed, the signal on PTIME 95 becomes inactive and the high voltage generator ceases to generate high voltage. Timer Module 112 cannot be retriggered until it is reset via an active low logic signal on POR 97.

Figure 5:
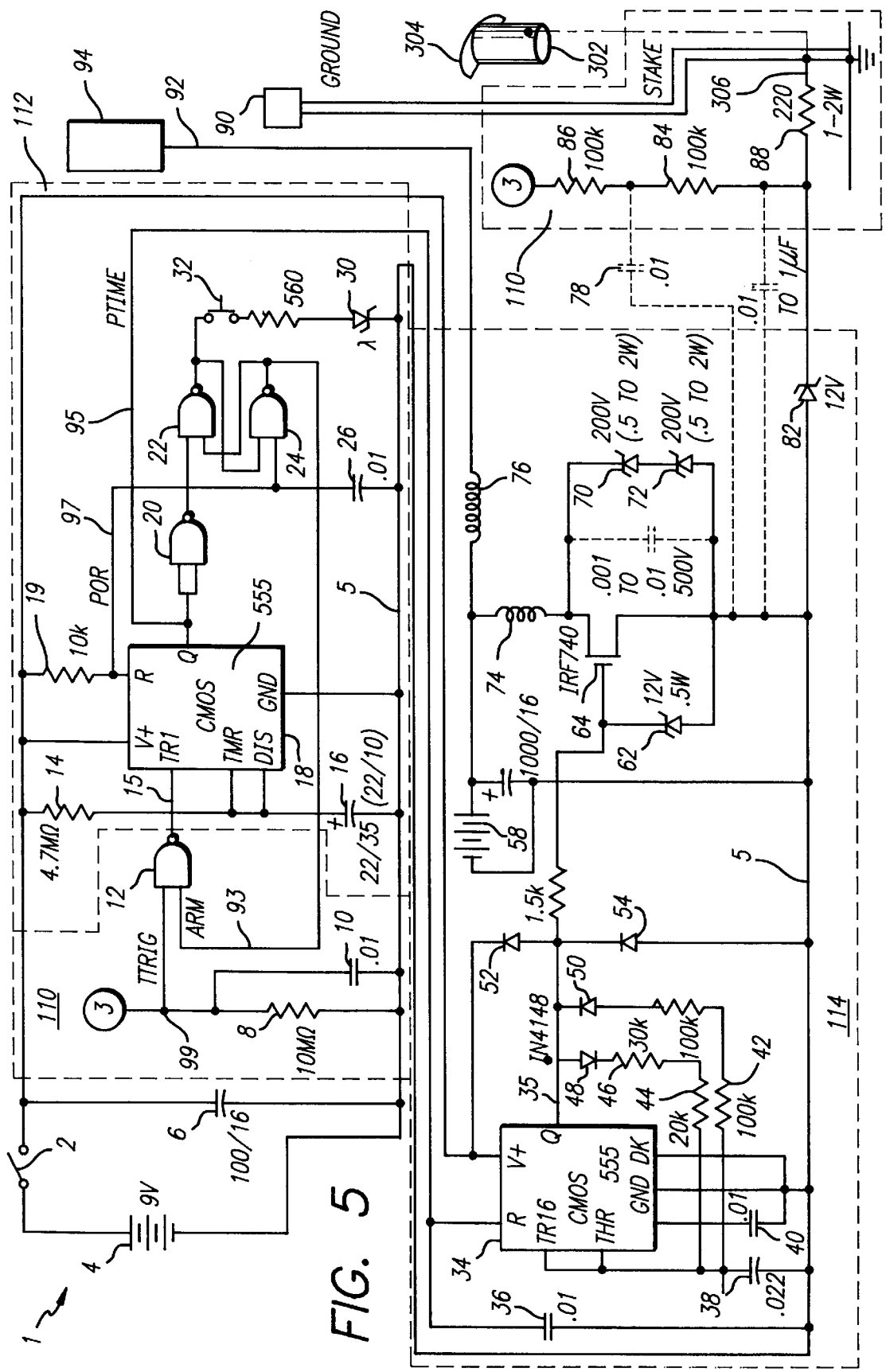
FIG. 5 is a detailed schematic of the electronic portion of the present invention.

FIG. 5 is a detailed circuit diagram of the modules discussed above; approximate outlines of the modules are indicated. Initialization of the circuit occurs as follows. When power is switched on via switch 2, battery 4 is connected to the supply inputs of CMOS 555 Timer Chip'S 18 and 34, as well as to those of NAND gates 12, 20, 22 and 24. The reset input of Timer Chip 18 is held briefly low by signal POR 97 until Capacitor 26 is charged through resistor 19, thereby resetting output PTIME 95 of Timer Chip 18 to a low state (i.e. a logic 0). The inactive state on PTIME 95 also resets Timer Chip 34 causing its output POUT 35 to assume a low state as well.

The momentary active low state of POR 97 also simultaneously resets the latch formed by cross-coupled NAND gates 22 and 24. This reset causes the state of output ARM 93 of NAND gate 24 to be initially high (i.e. a logic 1) and it remains latched in this state until the device is triggered.

One or more ground stakes 90 are inserted into the ground near the mechanical portion 100. Ground stake 90 is conductively coupled between the circuit ground 5 of electronic portion 1 and the earth via REF 306; in the case of the above-ground embodiment, REF 306 (and thus circuit ground 5) is connected to cylindrical portion 302. When a pest makes contact with conducting plate 94 and the earth (or cylindrical portion 302 in the above-ground embodiment), a small leakage or ground current (about 1 microamp) will be sourced from POWER SUPPLY 58 to the conductive plate 94, and will flow through the pest and into the ground stake 90 (or cylindrical portion 302). This current will flow through REF 306 and continues through resistors 88, 84, 86, and 8 back into circuit ground 5. In the preferred embodiment, POWER SUPPLY 58 is six 1.5 volt "C" cell batteries connected in series.

This current causes a voltage drop across resistor 8 sufficient to create a logical high at the TTRIG input of NAND gate 12. Capacitor 10 creates a time constant which delays the rising voltage on TTRIG 99 to ensure that the timer is not activated by a momentary presence of a pest. Those of skill in the art will recognize that it is critical that NAND gate 12 have extremely high input impedance. Accordingly, NAND gate 12 is chosen to be manufactured in CMOS technology. Any logic family, however, which is designed to provide sufficiently high impedance will work in this configuration. If Timer Module 112 has not been triggered since power-up, the ARM signal 93 is providing a logic high to the second input of NAND gate 12. Thus, when ground current flows at a level sufficient to create a logic high for signal TTRIG 99, the output of NAND gate 12 goes active low and triggers Timer Chip 18. Diodes 43 and 47 provide overvoltage protection for the input of NAND gate 12 coupled to TTRIG 99.

Once triggered, the CMOS 555 Chip 18 charges capacitor 16. The logic signal PTIME 95, which is output from Chip 18 and is coupled to both inputs of NAND gate 20, remains at a logic high level until the voltage across capacitor 16 charges to ⅔ of V+. The predetermined time during which PTIME 95 remains logically high is thus programmed through selection of the values of resistor 14 and capacitor 16, and is proportional to the product of the values of resistor 14 and capacitor 16. Those of skill in the art will be able to program such a timer to attain the desired timing values from the data sheet provided with the timer.

The amount of time necessary to reliably dispose of a particular pest will depend on the typical size of the type of pest to be dispatched and the amplitude of the current and voltage the high voltage and current generator is capable of providing. For the preferred embodiment of the invention, two minutes should be sufficient to dispatch rodents such as rats and gophers.

When PTIME 95 becomes active high upon trigger, the output signal ARM 93 from the latch formed by cross-coupled NAND gates 22 and 24 is latched to a logic low state. This disarms the trigger input 15 to Chip 18 by disabling NAND gate 12. This state of Timer Module 112 remains latched even after the predetermined time has elapsed and PTIME 95 has returned to a logic low level. The logic low value of ARM 93 therefore prevents any retrigger of Timer Chip 18 until the power is cycled off and then on by the user. A user can check the state of the latch by closing momentary switch 32. The light emitting diode (LED) 30 will illuminate if the unit has been triggered, informing the user that a rodent had been previously detected. Because the LED 30 is not continuously lighted, standby power consumption is kept low.

The PTIME 95 signal output from Timer Chip 18 is coupled to the reset input of a second CMOS 555 Timer Chip 34. Timer Chip 34 is held in a continuous reset state until PTIME 95 goes high in response to the triggering of Timer Chip 18. Once its reset input is released, Timer Chip 34 operates as an astable multivibrator as its output POUT 35 oscillates between logical high and low values; capacitor 40 charges and discharges through diodes 48 and 50 respectively to provide retriggering of the Timer Chip.

The time during which POUT 35 is high is equal to 0.69 times (the combined value of resistors 46 and 44 times the value of capacitor 38); POUT 35 is low for a time equal to 0.69 times (the combined values of resistors 42 and 43 times the value of capacitor 38). The oscillating signal POUT 35 is designed to be an audio frequency rectangular pulse sequence which is coupled to a flyback circuit of High Voltage Generator Module 114 to develop high voltage pulses. Once Timer Chip 18 times out and PTIME 95 resumes a logic low state, Timer Chip 34 is once again held in a continuous reset state and its ouput POUT 35 ceases to oscillate.

The rectangle pulse train on POUT 35 is converted into a high voltage pulse train as follows: POUT 35 is coupled to the gate of FET 64 which when driven high, allows current to flow between its source and drain. This current is drawn through inductor 74 which acts as the primary of a transformer. The inductance value of inductor 74 determines the rise time of the current through it. When POUT 35 switches to a logic low, FET 64 is shut off abruptly. The current flowing through inductor 74 stores energy in a resulting magnetic field so that when FET 64 is turned off, the stored energy is released in the form of a high voltage transient spike across inductor 74. This induced voltage has a value equal to L di/dt where L is the inductance value of inductor 74. The di/dt is determined by the switching time and internal capacitance of FET 64, and stray capacitance associated with the inductor and other circuit elements. The transient voltage across inductor 74 is stepped up as a function of the turns ratio between inductor 74 and inductor 76. Inductor 76 is directly coupled to conducting plate 94 so that the amplified high voltage pulse thus generated is applied to the rodent between the plate 94 and the ground stake 90 via the ground.

The pulse frequency is preferably in the audio range. The frequency of the high voltage pulse should be high enough to prevent the rodent from recovering between pulses and freeing itself. The amplitude of the pulses should be great enough to produce sufficient current through the pest to electrocute it. Those of ordinary skill will recognize that there are other ways to create lethal voltage and currents for purposes of electrocution that are intended to be within the scope of the present invention. The embodiment disclosed is preferred because it limits the amount of power drawn from the batteries used for portable and remote operation. Further, the high voltage and current output circuit has been designed to limit the ouput current and voltage levels below those which could be dangerous to humans.

The zener diodes 62, 70, and 72 limit the voltages across FET 64 and prevent overvoltage breakdown of FET 64. Diodes 52, 54, and the zener diode 82 are used to protect Timer Chips 18 and 34, as well as the IC chip containing NAND gates 12, 20, 22 and 24 from high voltage spikes which could damage the circuits or cause spurious triggering.

The invention has been described in conjunction with the preferred embodiment. Numerous alternatives, modifications, variations and uses which are intended to fall within the scope of the invention will be apparent to those skilled in the art in light of the foregoing description. The sensing mechanism may be used in a variety of environments and for a variety of purposes where conservation of power is desired and for which battery operation is desirable that are not explicitly described in the foregoing description. For example, it may be desirable to sense an animal's contact with a fence which can trigger the application of a repelling voltage to the fence for some predetermined time. The resistive switch could also be used to detect the presence of a human intruder; in this case, the trigger mechanism of the present invention may be coupled to an alarm system rather than a high voltage circuit.

Other minor modifications are possible. The duty cycle of the high voltage circuit can be varied by adjusting the various resistors and capacitors. The values of various resistors and capacitors may be changed to alter other timing aspects of the circuitry. The couplings between the mechanical and electronic portions of the present invention may assume a variety of known forms suitable to a particular application.

What is claimed is:

1. A method of electrocuting pests comprising the steps of:
    a) sensing the presence of one of said pests as a resistive body between a high voltage electrode and a reference electrode;
    b) triggering the activation of a high voltage and current generator in response to said sensed presence, said generator coupled between said high voltage electrode and said reference electrode, said triggered generator being activated for a predetermined time period;
    c) generating sufficient voltage and current using said generator to dispatch said pest within said predetermined time period;
    d) deactivating said generator only upon expiration of said predetermined time period or in response to a reset signal; and
    e) inhibiting said triggering step once activation of said generator is triggered, until said reset signal is detected.

2. The method of claim 1 wherein said manual reset is accomplished by cycling the power off and then on.

3. The method of claim 1 wherein said sensing step further comprises the step of creating a voltage drop with current flowing from said high voltage electrode, through said pest and into said reference electrode; and wherein said triggering step further comprises the step of activating a timer with said voltage drop, the output of said timer used to activate said generator for said predetermined time period.

4. The method of claim 3 wherein said step of creating a voltage drop further comprises the steps of:
    adjusting the amount of said current necessary to produce said voltage drop, thereby controlling the sensitivity of said triggering step; and
    adjusting the time constant in producing said voltage drop to avoid false triggers and to ensure good contact.

5. The method of claim 1 wherein said sensing, triggering, generating, deactivating and inhibiting steps are performed using battery power.

6. The method of claim 1 further comprising the step of providing status information concerning status of said method only upon manual activation by a user.

7. The method of claim 1 wherein said high voltage electrode is a conductive plate the bottom surface of which is electrically insulated from said reference electrode which is coupled to earth ground.

8. The method of claim 7 wherein said reference electrode is a ground stake coupled between a circuit reference node and the earth.

9. The method of claim 1 wherein said generator comprises a flyback transformer and a multivibrator, and wherein said triggering step further comprises the step of generating a rectangular pulse wave with said multivibrator, said flyback transformer being driven with said rectangular pulse wave.

10. The method of claim 1 wherein said sufficient voltage and current does not pose a lethal danger to humans.

11. An apparatus for electrocuting pests, said apparatus comprising:
   a mechanical portion, said mechanical portion comprising a high voltage electrode and a reference electrode electrically isolated from said high voltage electrode; and
   an electronic portion comprising:
      a) a resistive switch means having a trigger output, said switch means for detecting the presence of one of said pests between said high voltage electrode and said reference electrode, said switch means producing an active level on said trigger output in response to said detected presence when not disarmed;
      b) a means for generating a high voltage and current lethal to said one of said pests, said generating means coupled between said high voltage electrode and said reference electrode; and
      c) a timing means, having an input coupled to said trigger output of said resistive switch means, said timing means for activating said generator means for a predetermined time period in response to said active level on said trigger output of said resistive switch means, said timing means further comprising:
         a storage means having an arming/disarming output coupled to said resistive switch means and a reset input, said storage means for disarming said resistive switch means from reactivating said timing means after initiation of said predetermined time period, said storage means also for arming said resistive switch means only in response to active level on said reset input.

12. The apparatus of claim 11 wherein said resistive switch means further comprises a trigger means for generating a sense output which provides an active level when said presence is detected, the active level on said sense output producing an active level on said trigger output when said switch means is armed, but not when it's disarmed.

13. The apparatus of claim 11 wherein said timing means further comprises a status means, coupled to said storage means, for indicating status of said timing means only upon activation by a user.

14. The apparatus of claim 11 wherein said generator means further comprises a multivibrator means for generating a rectangular pulse wave coupled to a flyback transformer.

15. The apparatus of claim 11 wherein said high voltage electrode is a conductive plate the bottom surface of which is electrically insulated from said reference electrode which is coupled to earth ground.

16. An apparatus for electrocuting pests, said apparatus comprising:
   a) a mechanical portion comprising:
      i) a high voltage electrode; and
      ii) a reference electrode electrically isolated from said high voltage electrode; and
   b) an electronic portion comprising:
      i) a resistive switch coupled between said high voltage electrode and said reference electrode, said resistive switch further comprising a trigger circuit having a trigger output and an arm/disarm input;
      ii) a high voltage and current generator having a high voltage and current output coupled between said high voltage electrode and said reference electrode, and a control input by which operation of said generator is activated;
      iii) a timing module having an input coupled to said trigger output of said resistive switch, a control output coupled to said generator control input and an arm/disarm output coupled to said arm/disarm input of said resistive switch; and
      iv) wherein said resistive switch activates said timer with an active level on said trigger output when said resistive switch is armed by said timing module and one of said pests is in contact with said high voltage electrode and said reference electrode, said timing module turning on said generator with a continuous active level on said control output for a predetermined time period; and wherein said timing module disarms said trigger circuit of said resisitve switch upon said activation of said timer module until said timing module is reset.

17. The apparatus of claim 16 wherein said electronic portion is battery powered.

18. The apparatus of claim 16 wherein said timing module further comprises a power on reset circuit, said power on reset circuit arming said trigger circuit when power to said apparatus is cycled off and then on.

19. The apparatus of claim 16 wherein said timing module further comprises a status indicating circuit which indicates, only when activated by a user, whether said resistive switch is armed or disarmed.

20. The apparatus of claim 16 wherein said generator further comprises a multivibrator coupled to a flyback transformer.

21. The apparatus of claim 16 wherein said high voltage electrode is a conductive plate the bottom surface of which is electrically insulated from said reference electrode which is coupled to earth ground.

22. The apparatus of claim 16 wherein said resistive switch further comprises a current sensing circuit coupled to said trigger circuit, said current sensing circuit providing an active voltage level to said trigger circuit when one of said pests is in contact with said high voltage electrode and said reference electrode.

23. The apparatus of claim 22 wherein said active voltage level has a time constant which is adjustable to delay activation of said generator to ensure good contact between said electrodes.

24. The apparatus of claim 16 wherein said high voltage electrode is a conductive plate; and said reference electrode is a conductive body surrounding said conductive plate and is coupled to a circuit reference of said electronic portion.

* * * * *